(12) United States Patent
Kelly

(10) Patent No.: US 6,644,027 B1
(45) Date of Patent: Nov. 11, 2003

(54) APPARATUS FOR PROTECTING A WAVE ENERGY CONVERTER

(75) Inventor: Hugh-Peter Granville Kelly, 47 Crowstone Road, Westcliff on Sea, Essex (GB), 550 8BG

(73) Assignee: Hugh-Peter Granville Kelly, Westcliff on Sea (GB)

(*) Notice: Subject to any disclaimer, the term of this patent is extended or adjusted under 35 U.S.C. 154(b) by 0 days.

(21) Appl. No.: 10/031,793

(22) PCT Filed: Jul. 13, 2000

(86) PCT No.: PCT/GB00/02689

§ 371 (c)(1), (2), (4) Date: Jun. 12, 2002

(87) PCT Pub. No.: WO01/06118

PCT Pub. Date: Jan. 25, 2001

(30) Foreign Application Priority Data

Jul. 16, 1999 (GB) .............................................. 9916778

(51) Int. Cl.[7] ................................................ F03C 1/00
(52) U.S. Cl. .......................................... 60/498; 60/502
(58) Field of Search ........................... 60/497, 498, 502

(56) References Cited

U.S. PATENT DOCUMENTS

| | | | | |
|---|---|---|---|---|
| 3,487,228 A | * | 12/1969 | Kriegel | 290/52 |
| 4,103,494 A | * | 8/1978 | Tidwell | 60/648 |
| 4,206,601 A | * | 6/1980 | Eberle | 60/398 |
| 5,167,786 A | * | 12/1992 | Eberle | 204/228.2 |

FOREIGN PATENT DOCUMENTS

| | | | |
|---|---|---|---|
| DE | 4338103 | * | 11/1995 |
| EP | 0496146 | * | 7/1992 |
| GB | 1515743 | * | 6/1978 |

* cited by examiner

Primary Examiner—Hoang Nguyen
(74) Attorney, Agent, or Firm—Glenn Patent Group; Michael A. Glenn

(57) ABSTRACT

Apparatus for converting the motion of sea waves to electrical energy comprises at least one vertically oriented linear generator, relatively reciprocating motion of the armature and stator of which is driven by a float immersed in the sea directly below the motor armature. To protect the generator against unfavourable sea conditions, on the onset or occurrence of same, the float is moved to and held in a position in which it is clear of, or submerged, in the sea. This movement may be achieved in whole or in part by operating the linear generator as a linear motor.

11 Claims, 6 Drawing Sheets

Figure 1:
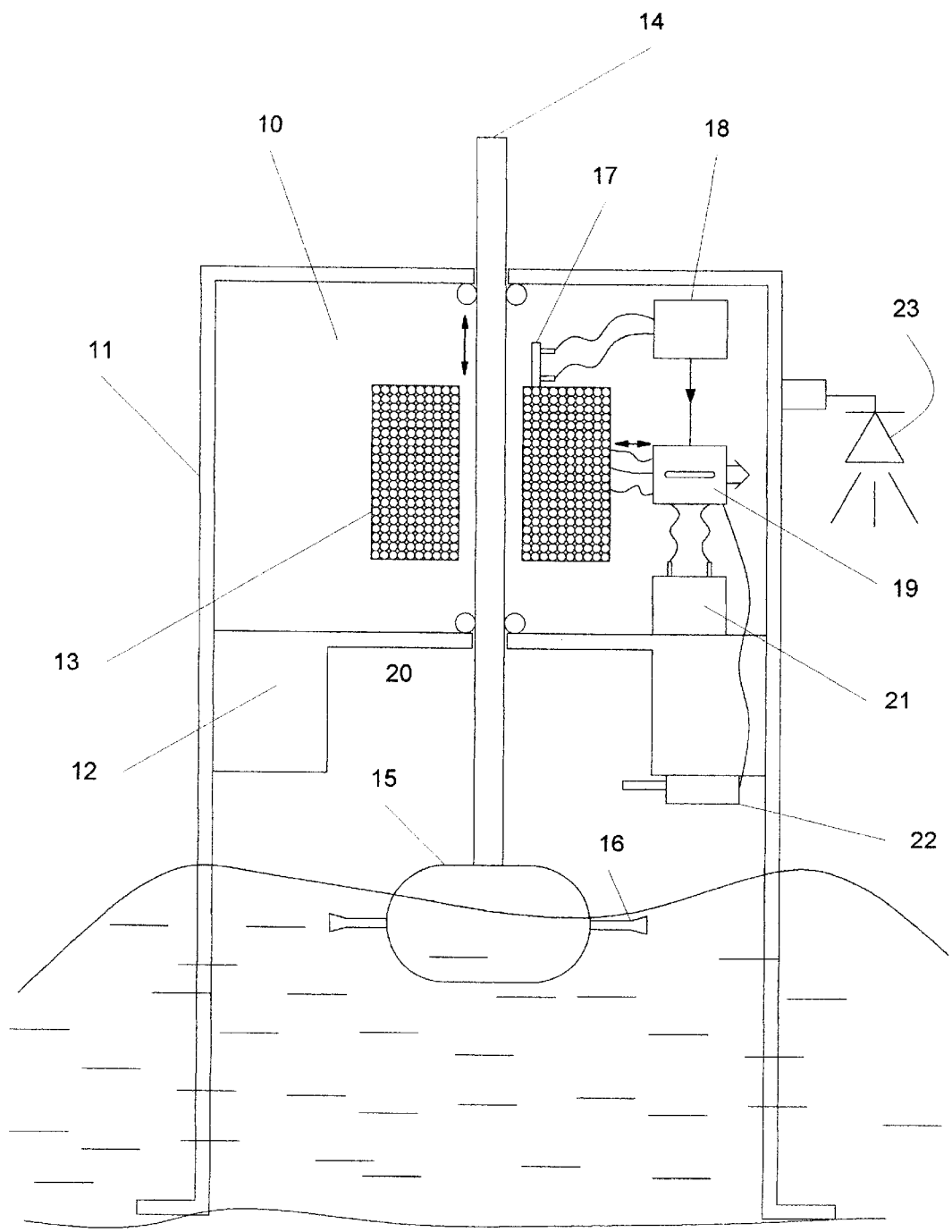

Figure 6a
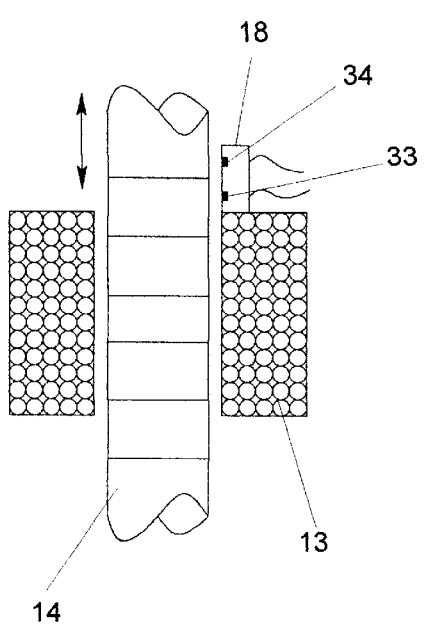
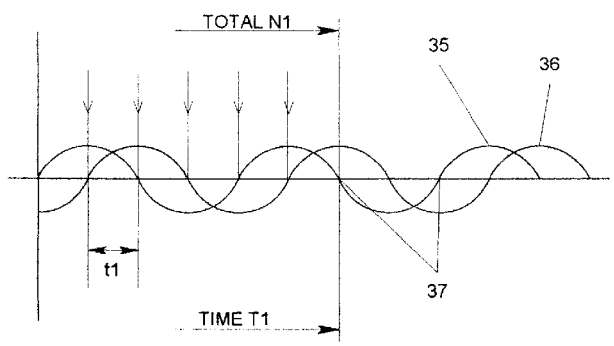
Figure 6b
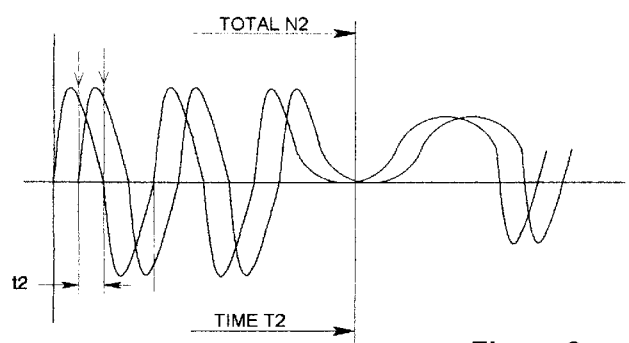
Figure 6c
$N > N_{Ref}$ = DANGER
AND/OR        Figure 6d
$t > t_{Ref}$ = DANGER
Figure 6

APPARATUS FOR PROTECTING A WAVE ENERGY CONVERTER

The following invention relates to apparatus which, in use, is located within the sea for the generation of electrical power from the motion of waves.

A number of devices have been tried and tested for this purpose, using the buoyancy of floats as a means of extracting energy, but as yet, none have proved to be of practical or economic use, or feasible in the long term. The efficacy of wave power generators, in common with all technological innovations, is determined by capital cost, the likely returns and reliability of operation. Of the three of these parameters, that which must be achieved first within the context of apparatus situated within the inhospitable and destructive environment of the oceans, is reliability.

Unless wave power apparatus can be made to function reliably and without risk of destruction over a reasonable period of time, consideration of the parameters of cost and return remains largely academic.

Of the various sea borne devices made to date, several do operate successfully to generate, experimentally, electrical power from the motion of waves. Examples of these are the hinged raft invented and developed by Sir Christopher Cockerell, and the bobbing duck invented and developed by Professor Steven Salter. There are several other such devices. These commonly operate by the use of buoyancy chambers, and the conversion of the undulating motion imparted thereto by sea waves into electrical power. Typical examples of conversion means are the use of gear chains, or hydraulic pumps, to turn rotary electrical generators.

These devices are, naturally, designed to operate effectively in 'average' sea conditions, that is, taking into account the probable normal wave duration, height, and energy.

Unfortunately, although maybe only several times a year, wild storms do occur, and during these, the kinetic energy imparted by sea waves to any structure or device they encounter can be two orders of magnitude greater than that for which the devices had been originally been designed.

In these conditions, terminal damage may and does occur to mechanical devices exposed to the full force of the storm, with commensurate down time and crippling costs of repair. Solving the problem of designing apparatus that can withstand these crippling costs of repair. Solving the problem of designing apparatus that can withstand these occasional onslaughts and at a reasonable capital cost, is essential for the viability of any form of wave power generating apparatus.

In a co-pending application of the applicant, entitled Sea Wave to Electrical Energy Conversion Plant and filed at the UK Patent Office on Jul. 16, 1999 as application no. 9916779.3, machinery is disclosed for converting the energy of sea waves directly to electrical power, by means of the use of a float immersed within the sea waves to cause relative movement between the armature and stator of a linear generator, and in particular, a linear generator being a linear motor used in reverse and of a tubular construction.

In the invention of this co-pending application, because a linear generator is employed, electricity is generated without any need for linear to rotary motion conversion means, as has been the case with the other devices mentioned above. Power station means are furthermore described in that application, in which multiple generating units are contained safely within a tower mounted above the sea waves, and motion of the float of each unit is imparted respectively to each linear generator by a rigid mechanical connection means, for example, a cylindrical tube, or the like.

EP-A-0496146 discloses an apparatus for the generation of electrical power from the motion of sea waves comprising: a) at least one linear generator comprising an armature, a stator and a float, the apparatus having a first state in which normal, generating, operation occurs, in which the float is immersed in the sea for driving the armature of the linear generator in a linear reciprocating motion relative to the stator to generate electrical power; b) detection means for detecting the onset or occurrence of sea conditions unfavourable to the operation or survival of the at least one generator; and c) control means, responsive to the detection means to place the apparatus in a second state in which the float is caused to be wholly or partially submerged, to an extent sufficient to avoid any significant damage to the generator.

The invention seeks to provide an improved form of such apparatus.

According to the present invention, there is provided apparatus for the generation of electrical power from the motion of sea waves comprising:

a) at least one linear generator comprising an armature, a stator and a float, the apparatus having a first state in which normal, generating, operation occurs, in which the float is immersed in the sea for driving the armature of the linear generator in a linear reciprocating motion relative to the stator to generate electrical power;

b) detection means for detecting the onset or occurrence of sea conditions unfavourable to the operation or survival of the at least one generator; and c) control means, responsive to the detection means to place the apparatus in a second state in which the float is caused to be held substantially or completely clear of the sea or to be wholly or partially submerged, in either case an extent sufficient to avoid any significant damage to the generator; and wherein d) the control means (19) are adapted to reverse the mode of operation of the linear generator to that of a linear motor, the float (15) being driven to where it is held in the second state at least partly under the action of the linear generator acting as a linear motor.

Other, optional, features of the invention are defined in the sub-claims.

Thus, by the means of this invention, ie reversing the mode of operation of the linear generator,—which may be effected by supplying appropriately commutated currents thereto by batteries, or even by the reverse flow of current from the grid that it is normally supplying, it thereby becomes a motor for the extraction or submersion of the vulnerable part of the apparatus away from the worst excesses of the sea, until such time as the unfavourable conditions have abated. At that time, the motor is then operated to restore the float to the waves, and once safely ensconced, normal operation is resumed again as a generator. This invention may clearly be applied to the case in which the generating apparatus is supported in a tower above sea level, (as described in the co-pending application), or to an alternative case where the generating apparatus is contained within a tower which itself is submerged.

Because of its dual function, the full benefit of using linear generating means as a power source thus becomes apparent, in contrast to previous devices where their operative components remain permanently within the sea, and cannot be conveniently removed in the event of a storm by reversal of their operation from generator to motor.

In a feature of a first arrangement of this invention, namely that in which, in the second state, the linear generator, acting as a motor, is used to lift the float above the waves, a rugged protection chamber is provided into which the float can fit at an upper point in its travel. To overcome the waste of energy necessary to maintain the float—by means of the linear motor—against gravity in its elevated position above the sea, a mechanical latch is provided to lock the float within its elevated position.

In a feature of the alternative arrangement of the invention, in which, in the second state, the float is submerged either partially, or completely below the worst excesses of the waves, thereby removing the need for any protection chamber as just described, the flotation chamber of the float is equipped with a valve, operable by the control means of the invention, for enabling flooding of the float to assist with its submersion. A secondary advantage of this arrangement is avoiding the waste of energy which would be need to power the linear generator, acting as a linear motor, to force and maintain the float in its submersed state.

Again, upon abatement of the storm, the float may be caused by the linear generator, acting as a linear motor, to emerge form the sea, with the flooding valve left open to enable water to drain from the float, and then to be closed for resuming normal operation of the device as a generator.

In an embodiment of this feature of the invention, a subsidiary hermetically sealed generator is enclosed within the float itself, operable by the motion of the float within the sea. The power generated thereby is used for two purposes, one being for the operation of a hazard warning lamp on the float, and the other, for supplying the electrical power necessary for operation of the flooding valve of the float. (A battery may be included as a storage means for the power thus generated.) Radio control means are further used to transmit from the control means of the invention, open/close signals to receptive control electronics housed within the float for operation, in turn, of the flooding valve. Thus the need for any electrical connection to the float is obviated, with commensurate advantages of simplicity and reliability.

According to a further, optional, feature of the invention, the aforementioned detection means used for determining whether to remove the float from the worst excesses of the sea waves, obtains its information from apparatus responsive to the relative motion of the stator and armature of the linear generator itself. This thereby directly provides information as to the aggressiveness of the motion of the sea waves. Compared with a pre-established wave motion data base, or other specific reference information, the information so gained is provided to the generator control means to automatically cause extraction/submersion of the float at an appropriate point, ie before wave motion becomes dangerously violent.

In yet a further feature related to this aspect of the invention, sea behaviour monitoring apparatus external to the wave power generating apparatus, is used instead of or in combination with the previously described means, to detect the onset or growth of storm conditions, and then to provide the necessary safety signal to the float extraction/submersion control means. Such apparatus may be, for example, one or more remote detector probes located in the sea well away from the generating apparatus—so providing sufficient time for its self protection as herein described—or even the use of satellite or weather forecasting information.

Figure 2:
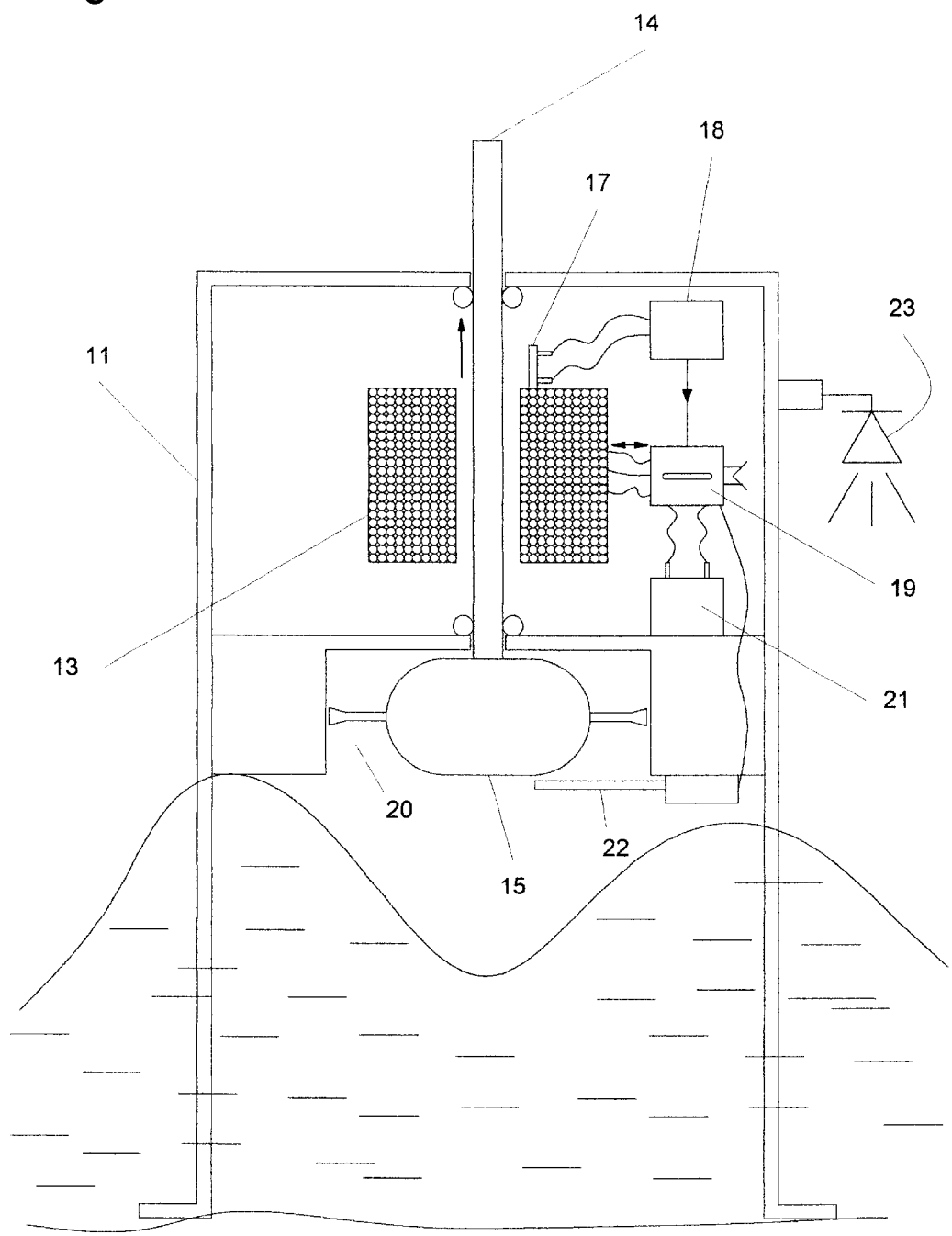
Figure 3:
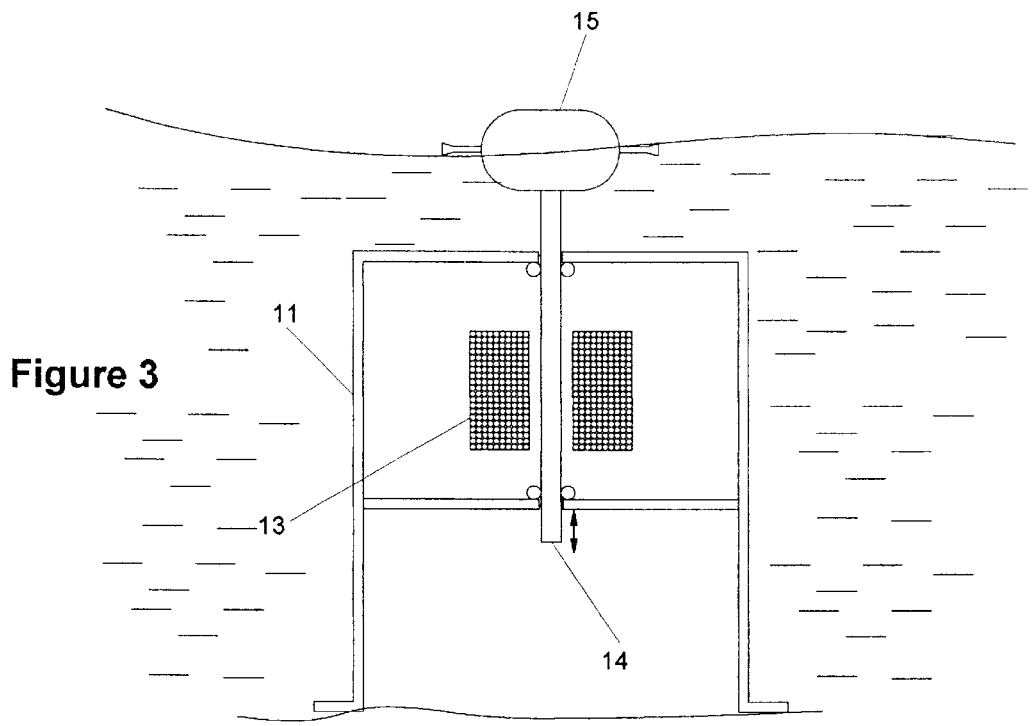
Figure 4:
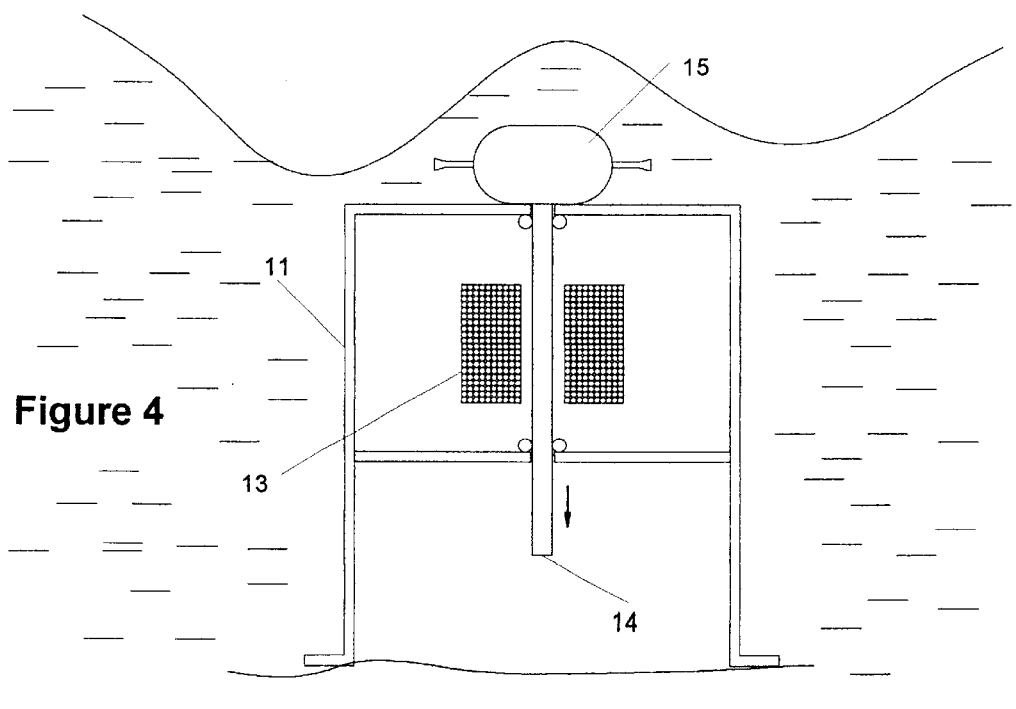
Figure 5:
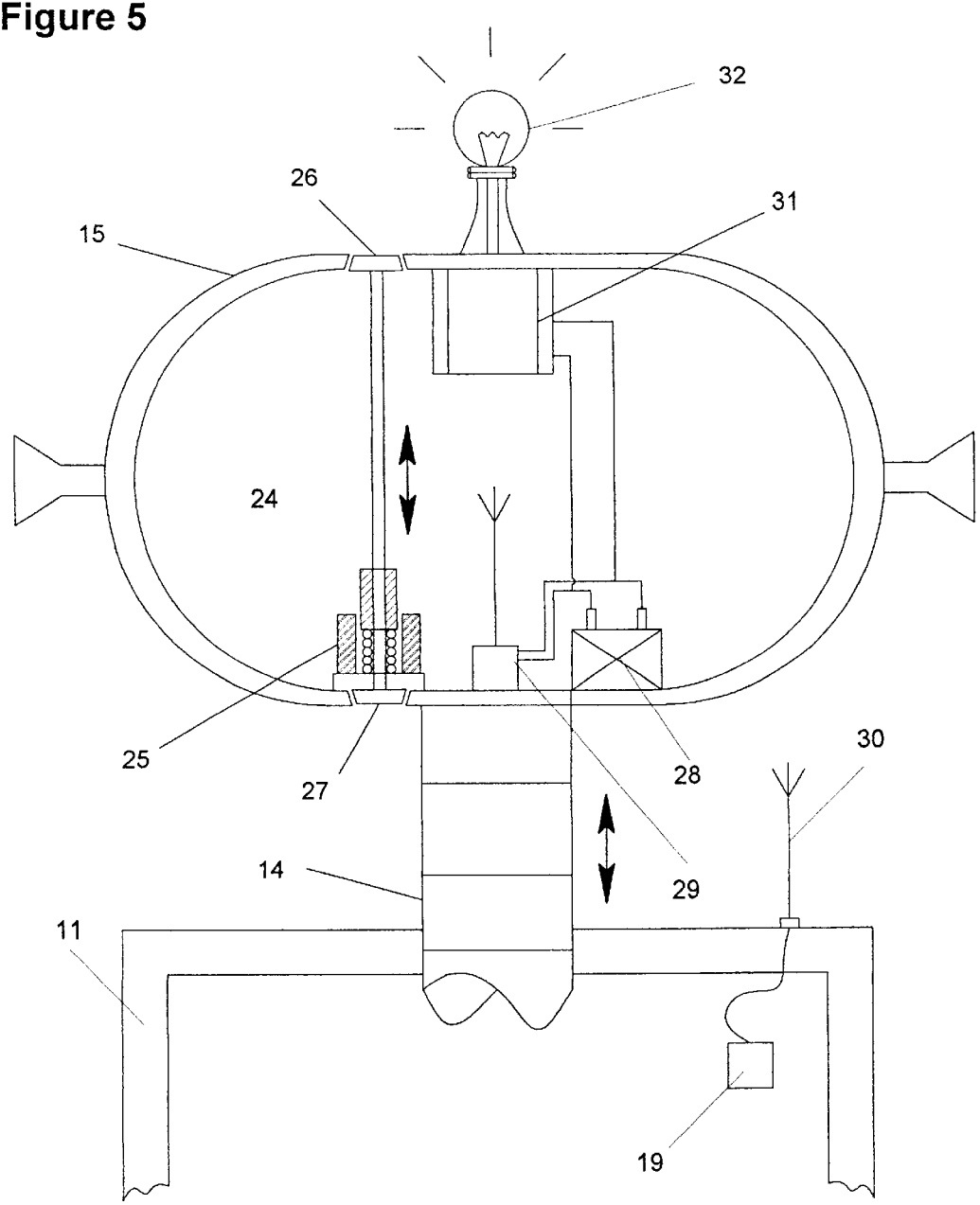
Figure 7:
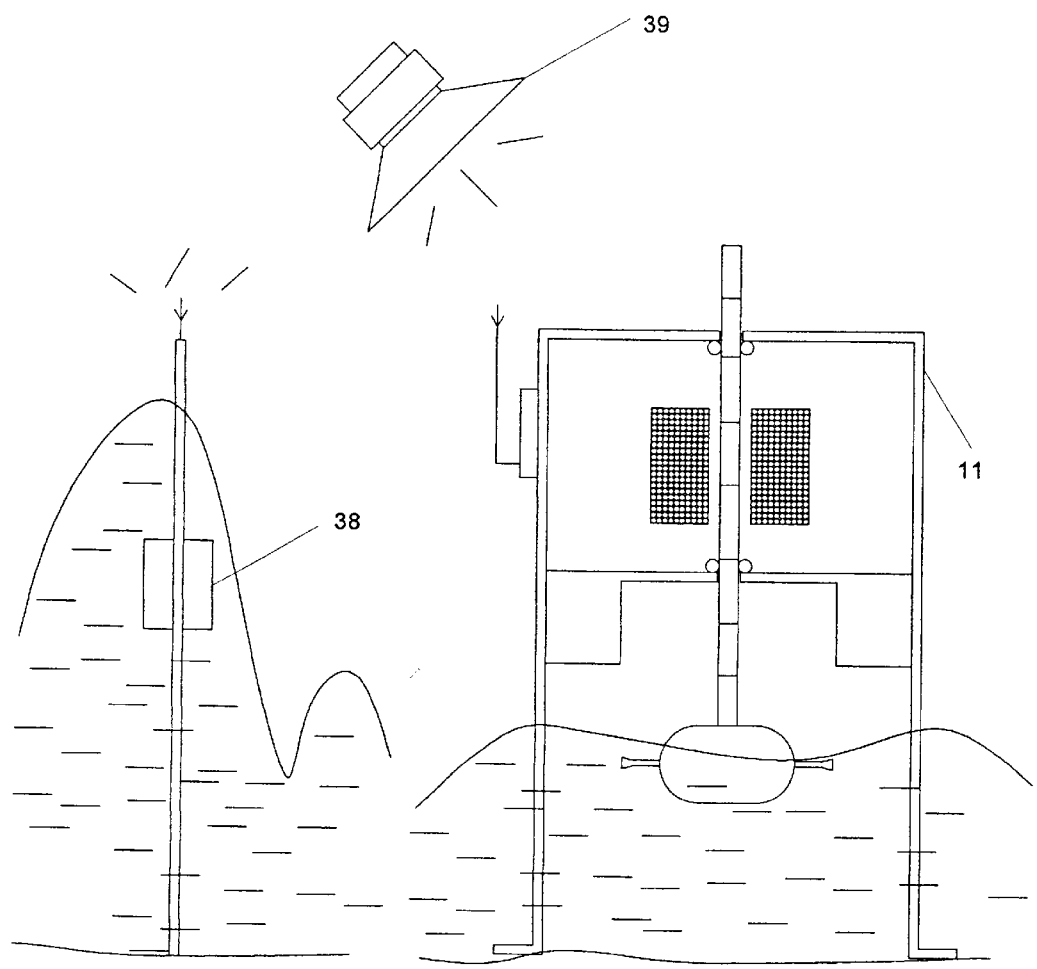

The invention will now be described, by way of example, with reference to the accompanying drawings in which:

FIG. 1 shows apparatus, mounted above sea level, for generating electrical power from the motion of waves, FIG. 2 shows the same apparatus as FIG. 1, but with part of the apparatus protected from storm conditions, FIG. 3 shows the apparatus of FIG. 1, but mounted below sea level, FIG. 4 shows the same apparatus as FIG. 3, but with part of the apparatus protected from storm conditions, FIG. 5 is a diagram of a flotation chamber used as part of the generating apparatus, and equipped with flooding means, FIG. 6 shows schematically the operation of measurement means, used to detect storm conditions and FIG. 7 shows arrangements for using detection means to provide advance warning to the apparatus of FIGS. 1 to 4 of imminent storm or wave conditions.

Referring to FIG. 1, apparatus for generating electrical power from the motion of waves, is depicted generally at 10. The apparatus includes a tower 11 for holding the apparatus and locating it on the sea bed. The tower 11 houses a platform 12 on which is mounted the armature 13 of a linear generator. In the realisation shown, the generator is of tubular construction, and its stator, 14, passes coaxially through the armature. Guidance of the stator is by means of rollers. The stator itself is a tube housing a sequence of magnetic components which together provide a series of radial magnetic fields along the tube's length. These fields link with the coils of the armature for the purpose of generating electricity. The stator depends down through the platform 12, as shown, and is attached at its lower end to a float 15, equipped with ancillary paddles 16.

The operation of the apparatus, as is fully disclosed in my co-pending application, is described briefly here to assist in an understanding of the invention the subject of this application. As the waves below the platform ascend, the natural buoyancy of the float lifts the stator up through the platform, so resulting in relative movement between the stator and armature of the generator. Electricity is generated as a result of this relative motion. Similarly, as the waves fall, the weight of the stator and its float causes the stator also to fall, so again causing relative motion, and the further generation of electricity.

In stormy conditions, it is desirable to protect the float and paddle combination 15, 16, from destruction, or indeed destruction of the whole apparatus, by over-vigorous waves. To this end, and in accordance with the invention, detection and measurement means 17 and 18 are located within the tower to detect and measure the rate of movement of the stator of the generator, and also the extent of its movement. The detection means 17 may comprise Hall effect detectors located adjacent to the magnetic stator of the generator, so providing information on its movement as the series of stator magnetic fields passes the detectors. By using two detectors with a phase displacement of 90°, ie in phase quadrature, information is made available in terms of direction, position and speed.

Alternatively, as an addition to or in place of use of the Hall effect components, the mmf voltages generated by the armature may be measured and assessed. In accordance with electrical engineering theory, the amplitude of these voltages provides information on the rate of movement, and the number of cycles generated in a particular movement of the stator provides information on the overall distance travelled.

The signals so provided, by either or both of the Hall effects and the mmf waveforms, are processed by the measurement unit, 18, and compared with pre-recorded data. This may be in the form of statistical data illustrative of conditions typically proceeding a storm. In the event that the comparison indicates consistently potentially destructive sea conditions, a danger signal is issued from the measurement means 18, to control means, 19.

The function of the control means is important, and is central to this invention. It is to change the operation of the linear generator to that of a linear motor. Rather than receiving generated currents, and passing these on to external distribution networks, the control means instead feeds the coils of the generator—now acting as a motor—with appropriately commutated currents to effect movement. (It is well known that permanent magnet rotary motors function also as generators, and precisely the same principle applies, naturally, to linear generators. Note, the necessary commutation signals may be obtained from the above-referred Hall effect detectors.)

Upon receipt of the danger signal, the control means causes the linear generator—now acting as a motor—to lift the float clear of, or substantially clear of, the sea waves, and to nestle it into a protective cavity, 20, as shown schematically in FIG. 2. To minimise the effort required, this is effected when the float is already lifted to a high point by the waves. Both the control and measurement means, as well as other local electronic circuitry, may be supplied by a battery 21 kept charged by the generator when in normal operation. Once within the protective cavity, a mechanical latch 22, operable by the control means, is used to maintain the float within its cavity, rather than waste power by using the linear generator (motor) for this purpose.

A timer (not shown) within the control means, is used to cause it to restore the float and paddle to sea level after a period of time reasonable for typical storms in the area to abate. External detection means 23, for example sonic detectors, or a subsidiary continually immersed buoy—not shown—may be employed as a 'back-up' to ensure—before the float is re-immersed—that the storm has indeed passed.

Thus, it will be appreciated that wave powered generating apparatus is provided which, in operation, is substantially immune to the ravages of excessive storms. It is well known that oil rigs and the like are designed to withstand appalling storms. The same or similar technology and designs which are used for their construction and manufacture may be adapted for a tower construction housing many rows and columns of generators, but equipped with the above described safety mechanism, so providing an effective long term and reliable means of generating free power.

Referring to FIG. 3, an alternative outline arrangement is illustrated in which the tower 11, rather than holding the generating apparatus above the sea, is instead totally submerged. It is self-evident that the generation function is precisely the same as that of the previously described arrangement. However, in the event of a storm, rather than lift the float and paddle combination clear of the waves, the control means is instead used to cause the linear generator—now acting as a motor—to submerge the float itself well below the sea wave level, as shown in FIG. 4. In this case, no protective chamber is required, as the float is protected by the sea itself. With regard to this alternative arrangement, all of the above described detection, measurement and restoration functions relating to the tower-above-sea-level embodiment remain the same.

In this alternative arrangement, rather than having to force the float and paddle below sea level, against their natural buoyancy, the float may be equipped with a flooding valve to assist this process, refer to FIG. 5. The flooding valve is shown at 24, and is electromagnetically operated at 25 to allow air to escape from the top 26 of the flotation chamber, while sea water enters from the bottom at 27.

Current supply to the electromagnet is provided by a storage battery 28, and is switched on and off by a radio controlled unit 29. When it is desired to flood the chamber, radio signals are transmitted to the unit by transmission means 30 activated by the control means situated within the tower. An internal generator 31 is used to generate currents by means of the oscillating motion of the float during normal operation. These currents are used to maintain charged the battery 28, which as well as supplying the valve and radio receiver, can also be used to illuminate a hazard warning light 32. Once it is safe to resume operation, the float is returned to the surface and lifted above wave level to allow sea water to drain out from it. The valve is then closed, using the radio control, and the float re-established within the waves for the continued generation of power.

It will be appreciated that in the case of the submerged arrangement, all of the unsightly elements of the generating apparatus are maintained below sea level, the only visible parts being the floats—which may be coloured sea blue.

For the sake of a comprehensive description of the possible realisations of the invention, it is mentioned here that the first arrangement can also of course be made to submerge the float during a storm, rather than extract it, but with the disadvantage that a long stator tube would be required, and that this itself would remain exposed to the waves.

With reference to FIGS. 6a–d, the method of operation of the measurement means 18 is now described in more detail.

The moving magnetic stator of the generator is shown at FIG. 6a at 14, and its armature at 13. The detection means 18 is affixed adjacent to the armature. This comprises two Hall effect sensors, 33 and 34, along with their complementary circuitry.

The method of operation is as follows. As the stator of the generator is caused by the float to traverse the Hall effect sensors, so waveforms are produced indicating the rate and extent of movement, as shown at 35 and 36, see FIG. 6b. A direction change over point is illustrated, for interest, at 37. The number of detected waveforms N1 indicates the distance travelled by the stator, and the time, t1 between successive cross-over points indicates the rate of movement. The overall stroke time is indicated by T1.

In the event of over-vigorous conditions, see FIG. 6c, the number of waveforms N2 will clearly increase with greater waveheight, and in the event of more rapid movements, the time t2 will diminish.

The measurement means can then be used to compare the parameters, N and t, against reference figures as shown at FIG. 6d, or a range of pre-recorded charted figures indicative of imminent storm conditions. A determination can thus be made as to whether to extract (or submerge) the float for its protection.

In certain oceanic locations, particularly those susceptible to earthquakes, one-off groups of waves having considerable magnitude and energy may occur. They may arrive with little or no warning. In this event, local internal sensors used to gather information on wave conditions, will be unable to withdraw the float from the sea in time to prevent damage thereto. Instead, remote sensors may need to be employed.

An example of such an arrangement is shown at FIG. 7. In this, one or more probes 38, remote from the tower 11, are used to detect the arrival of such a wave, and a corresponding danger signal is transmitted to the tower control means. Alternatively, or in addition, such a signal may be provided by a satellite 39, responding to measurement of the sea conditions, or indeed by a signal relayed thereto by weather and/or seismic activity monitoring stations. In each case, the purpose being to ensure the apparatus is made safe before the onslaught of tsunami type waves.

Numerous variations will be apparent to those skilled in the art.

What is claimed is:

1. Apparatus for the generation of electrical power from the motion of sea waves comprising:

a) at least one linear generator comprising an armature (13), a stator (14) and a float (15), the apparatus having a first state in which normal, generating, operation occurs, in which the float is immersed in the sea for driving the armature of the linear generator in a linear reciprocating motion relative to the stator to generate electrical power;

b) detection means (18,23) for detecting the onset or occurrence of sea conditions unfavourable to the operation or survival of the at least one generator; and c) control means (19), responsive to the detection means to place the apparatus in a second state in which the float (15) is caused to be held substantially or completely clear of the sea or to be wholly or partially submerged, in either case an extent sufficient to avoid any significant damage to the generator; and wherein d) the control means (19) are adapted to reverse the mode of operation of the linear generator to that of a linear motor, the float (15) being driven to where it is held in the second state at least partly under the action of the linear generator acting as a linear motor.

2. Apparatus according to claim 1, wherein the armature, the stator and the axis of said linear reciprocating motion of the armature and float are substantially vertical and wherein, during entry into operation in the second state, the float assumes a position outside the range of reciprocating motion thereof during operation in the first state.

3. Apparatus according to claim 2, wherein the control means includes circuitry for controlling and energising the operation of the linear generator to act as a linear motor.

4. Apparatus according to claim 1 wherein a releasable mechanical latch catch (22) is provided to hold the float in said position.

5. Apparatus according to claim 1 wherein the detection means (18) includes circuitry for monitoring signals produced by the generating relative motion of the linear generator armature and stator to detect indications by said signals of the onset or occurrence of said sea conditions.

6. Apparatus according to claim 1 wherein the detection means (23) is arranged so as, in use, to be disposed remotely from the remainder of the apparatus, to provide advance notice of unfavourable conditions or the imminence of a dangerous wave.

7. Apparatus according to claim 1 and including a structure (11) on which the at least one generator is mounted and from which the generator depends, the structure including a protective cavity or chamber (20) into which the float (15) is withdrawn to be held substantially or completely clear of the sea when the apparatus is in the second state.

8. Apparatus according to claim 1 and including a mechanism (25,27) for at least partly flooding the float to assist its submersion in the second state.

9. Apparatus according to claim 8, wherein the float of the or each generator has enclosed within it a hermetically sealed subsidiary electrical generator (31).

10. Apparatus according to claim 9, and including a hazard warning lamp (32) on the float, the subsidiary generator (31) being operable to energise said lamp (32).

11. Apparatus according to claim 8, the mechanism (25, 27) including a flooding valve of the float, the subsidiary generator (31) being operable to energise said valve.

* * * * *

UNITED STATES PATENT AND TRADEMARK OFFICE
CERTIFICATE OF CORRECTION

PATENT NO.    : 6,644,027 B1
DATED         : November 11, 2003
INVENTOR(S)   : Kelly It is certified that error appears in the above-identified patent and that said Letters Patent is hereby corrected as shown below:

Title page,
Item [54], Title, replace "APPARATUS FOR PROTECTING A WAVE ENERGY CONVERTER" with -- SAFEGUARDING WAVE TO ELECTRICAL POWER GENERATING APPARATUS --.

Signed and Sealed this

Eleventh Day of May, 2004

JON W. DUDAS
*Acting Director of the United States Patent and Trademark Office*